US008055473B2

(12) United States Patent
Mericas

(10) Patent No.: US 8,055,473 B2
(45) Date of Patent: Nov. 8, 2011

(54) PERFORMANCE MONITOR UNIT FOR SAMPLING ALL PERFORMANCE EVENTS GENERATED BY A PROCESSOR

(75) Inventor: Alex E. Mericas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 12/485,863

(22) Filed: Jun. 16, 2009

(65) Prior Publication Data

US 2009/0276185 A1 Nov. 5, 2009

Related U.S. Application Data

(60) Continuation of application No. 11/549,136, filed on Oct. 13, 2006, now Pat. No. 7,548,832, which is a division of application No. 11/044,450, filed on Jan. 27, 2005, now Pat. No. 7,200,522.

(51) Int. Cl.
*G06F 11/30* (2006.01)
(52) U.S. Cl. ..................... 702/182; 714/47.1
(58) Field of Classification Search .......... 702/182–187; 714/1, 37–39, 46, 47, 47.1
See application file for complete search history.

(56) References Cited

U.S. PATENT DOCUMENTS

| | | | |
|---|---|---|---|
| 4,231,106 A | 10/1980 | Heap et al. | |
| 5,321,838 A | 6/1994 | Hensley et al. | |
| 5,682,328 A | 10/1997 | Roeber et al. | |
| 5,696,701 A * | 12/1997 | Burgess et al. | 714/25 |
| 5,835,705 A * | 11/1998 | Larsen et al. | 714/47.1 |
| 6,269,412 B1 | 7/2001 | Liu et al. | |
| 6,446,029 B1 * | 9/2002 | Davidson et al. | 702/186 |
| 6,718,403 B2 | 4/2004 | Davidson et al. | |
| 6,792,392 B1 | 9/2004 | Knight | |
| 7,448,025 B2 * | 11/2008 | Kalafatis et al. | 717/128 |
| 2002/0073255 A1 | 6/2002 | Davidson et al. | |
| 2006/0143421 A1 | 6/2006 | Subramoney et al. | |

* cited by examiner

*Primary Examiner* — Manuel L Barbee
(74) *Attorney, Agent, or Firm* — Yee & Associates, P.C.; Matthew W. Baca

(57) ABSTRACT

Detecting and recording events in a processor with a performance monitor in the processor that samples events. The performance monitor in the processor receives performance event signals generated by the processor that indicate the current full event state of the processor. A limited number of counters are provided in the performance monitor for counting only a selected subset of the performance event signals. An event register is provided in the performance monitor that intercepts the performance event signals prior to the subset of the performance event signals being counted. The performance event signals are stored together as a single unit in the event register. The unit is a full set of available performance event signals that indicate the current full event state of the processor.

19 Claims, 3 Drawing Sheets

PERFORMANCE MONITOR UNIT FOR SAMPLING ALL PERFORMANCE EVENTS GENERATED BY A PROCESSOR

This application is a continuation of application Ser. No. 11/549,136, filed Oct. 13, 2006, now U.S. Pat. No. 7,548,832, which is a divisional of application Ser. No. 11/044,450, filed Jan. 27, 2005, now U.S. Pat. No. 7,200,522.

BACKGROUND OF THE INVENTION

1. Technical Field

The present invention is directed to the field of microprocessors and more particularly to a microprocessor including a performance monitor unit that includes an event register for storing the current event signal values of a set of event signals where the set of signals are captured and stored in the event registers as one unit that represents the full event state of the processor.

2. Description of Related Art

In typical computer systems utilizing processors, system developers desire optimization of execution software for more effective system design. Usually, studies of a program's access patterns to memory and interaction with a system's memory hierarchy are performed to determine system efficiency. Understanding the memory hierarchy behavior aids in developing algorithms that schedule and/or partition tasks, as well as distribute and structure data for optimizing the system.

Performance monitoring is often used in optimizing the use of software in a system. A performance monitor is generally regarded as a facility incorporated into a processor to monitor selected characteristics to assist in the debugging and analyzing of systems by determining a machine's state at a particular point in time. Often, the performance monitor produces information relating to the utilization of a processor's instruction execution and storage control. For example, the performance monitor can be utilized to provide information regarding the amount of time that has passed between events in a processing system. The performance monitor can also be used to provide counts of the number of occurrences of selected events in a processing system. The information produced usually guides system architects toward ways of enhancing performance of a given system or of developing improvements in the design of a new system.

Most modern microprocessors contain built-in hardware for performance monitoring. Typically, a small number of counters, such as between two and eight counters, are implemented in the performance monitor. Each one of these counters can count a single event from a single event signal. The number of provided counters, however, is never sufficient to fully explore the full event state of the processor.

The full event state of the processor includes multiple different event signals. For example, 32 or more signals, which is the full event state of the processor, may be received by a performance monitor which must then select between two and eight signals out of the possible 32 or more signals to count. Therefore, the performance analyst must make multiple runs collecting a different subset of the total signals during each run in order to collect the full set of signals.

In addition, the counters provide only a raw number of counts. The raw number is the number of times a particular event occurred on a particular event signal. The counters do not provide an indication of the concurrence of events, that is, how often a set of events happened together during the same clock cycle.

Therefore, a need exists for an event register that stores the current event signal values of a set of event signals where the set of signals are captured and stored in the event registers as one unit that represents the full event state of the processor.

SUMMARY OF THE INVENTION

An apparatus and computer program product are disclosed for sampling all performance event signals generated by a processor. A performance monitor is included in the processor. The performance monitor receives performance event signals from the processor. These performance event signals indicate the current full event state of the processor. A limited number of counters are provided in the performance monitor for counting only a selected subset of the performance event signals. An event register is provided in the performance monitor that intercepts the performance event signals prior to the subset of the performance event signals being counted. The current values of the performance event signals are stored together as a single unit in the event register. The unit is a full set of the values of the available performance event signals that indicate the current full event state of the processor at a particular time.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present disclosure enables the sampling of all performance events that are generated by a processor by capturing the full event state of the processor at any one particular time. The processor includes a performance monitor. The performance monitor includes a plurality of counters that count events on only a selected subset of event signals. The counters do not provide anything more than a raw number of events. The counters do not indicate which events occurred concurrently within the processor.

The present invention provides a software accessible event register in the performance monitor that indicates the full event state of the processor at each clock cycle. The current values of multiple different event signals are stored together in the event register as one unit. This one unit then indicates the full event state of the processor during a particular clock cycle.

The current contents of the event register may be copied, either by the event register itself or control logic included in the performance monitor, into other storage upon the occurrence of a predefined condition, or may be retrieved by a software routine at a time determined by that routine.

The current values of a set of performance events are captured and stored within the event register at each clock cycle. If the current contents of the event register are not stored, they are overwritten with new contents during the next clock cycle.

The event register preferably stores the values of all performance events generated by the processor. Alternatively, the event register may store the values of only selected performance events. Regardless of whether all or only a subset of events is stored in the event register, the contents of the event register will indicate a particular state of the processor at a particular clock cycle. Thus, the contents of the event register indicate which events occurred concurrently together during the particular clock cycle.

Figure 1:
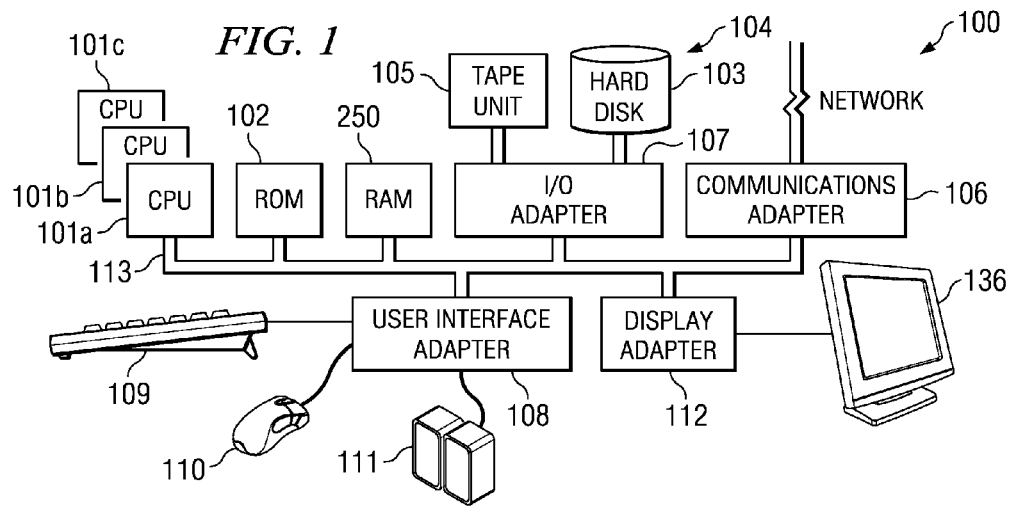
FIG. 1 depicts a high level block diagram of a data processing system which includes the present invention in accordance with the present invention.

FIG. 1 depicts a high level block diagram of a data processing system which includes the present invention in accordance with the present invention. System 100 has one or more central processing units (processors) 101a, 101b, 101c, etc. (collectively or generically referred to as processor(s) 101. Processors 101 are coupled to system memory 250 and various other components via system bus 113. Read only memory (ROM) 102 is coupled to the system bus 113 and may include a basic input/output system (BIOS), which controls certain basic functions of system 100.

FIG. 1 further depicts an I/O adapter 107 and a network adapter 106 coupled to the system bus 113. I/O adapter 107 may be a small computer system interface (SCSI) adapter that communicates with a hard disk 103 and/or tape storage drive 105. I/O adapter 107, hard disk 103, and tape storage device 105 are collectively referred to herein as mass storage 104. A network adapter 106 interconnects bus 113 with an outside network enabling data processing system 100 to communicate with other such systems.

Display monitor 136 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Additional input/output devices are shown as connected to system bus 113 via user interface adapter 108 and display adapter 112. A keyboard 109, mouse 110, and speaker 111 all interconnected to bus 113 via user interface adapter 108.

Thus, system 100 includes processing means in the form of processors 101, storage means including system memory 250 and mass storage 104, input means such as keyboard 109 and mouse 110, and output means including speaker 111 and display 136. In one embodiment a portion of system memory 250 and mass storage 104 collectively store an operating system such as the AIX™.

Figure 2:
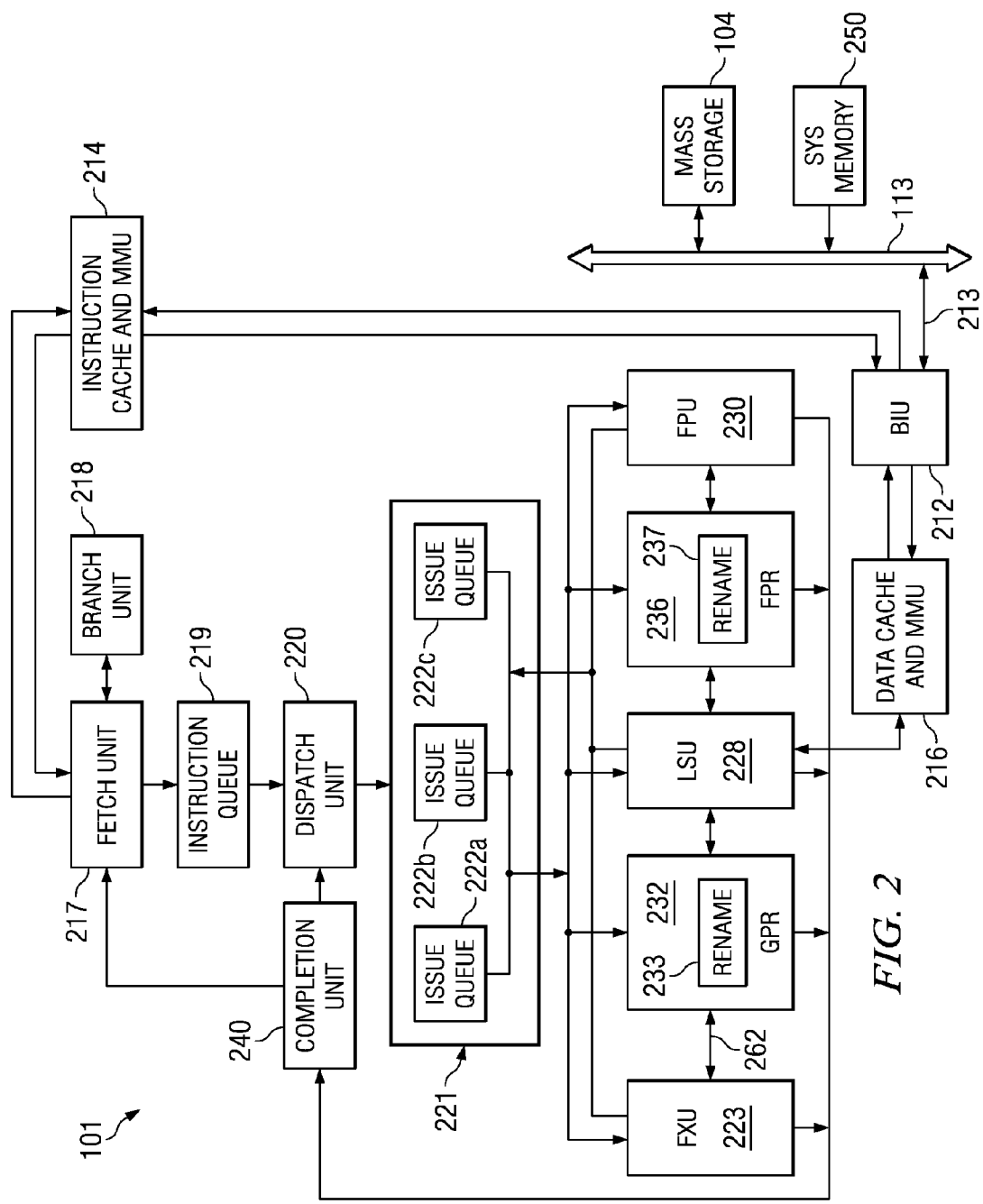
FIG. 2 is a high level block diagram of the processor of FIG. 1 that includes the present invention in accordance with the present invention.

FIG. 2 is a high level block diagram of the processor of FIG. 1 that includes the present invention in accordance with the present invention. Processor 101 comprises an integrated circuit superscalar microprocessor fabricated on a single monolithic semiconductor substrate. Processor 101 includes various execution units, registers, buffers, memories, and other functional units as discussed in greater detail below. Processor 101 is coupled to system bus 113 via bus interface unit (BIU) 212 and processor bus 213, which like system bus 113 includes address, data, and control buses. BIU 212 controls the transfer of information between processor 101 and other devices coupled to system bus 113, such as system memory 250 and mass storage 104. It will be appreciated that processor 101 may include other devices coupled to system bus 113 that are not necessary for an understanding of the following description and are accordingly omitted for the sake of simplicity.

BIU 212 is connected to instruction cache and memory management unit 214 and data cache and memory management unit 216 within processor 101. High-speed caches, such as those within instruction cache 214 and data cache 216, enable processor 101 to achieve relatively fast access times to a subset of data or instructions previously transferred from system memory 250, thus improving the speed of operation of data processing system 100. Data and instructions stored within data cache 216 and instruction cache 214, respectively, are identified and accessed by address tags, each comprising a selected number of bits (typically the high-order bits) of the system memory physical address in which the data or instruction reside.

Sequential fetch unit 217 retrieves instructions for execution from instruction cache 214 during each clock cycle. In one embodiment, if sequential fetch unit 217 retrieves a branch instruction from instruction cache 214 the branch instruction is forwarded to branch processing unit (BPU) 218 for execution. Sequential fetch unit 217 forwards non-branch instructions to an instruction queue 219, where the instructions are stored temporarily pending execution by other functional units of processor 101. A dispatch unit 220 is responsible for retrieving stored instructions from queue 219 and forwarding the instructions to an issue unit (ISU) 221. Dispatch unit 220 schedules dispatch of instructions to issue unit 221 based, in part, on instruction completion information received from a completion unit 240.

The depicted embodiment of ISU 221 includes one or more issue queues 222a, 222b, 222c, etc. (collectively or generically referred to issues queue(s) 222). ISU 221 is responsible for maintaining fully loaded pipelines by issuing new instructions in each cycle to the execution units whenever possible. In one embodiment, instructions are issued from ISU 221 out-of-order.

In the depicted embodiment, the execution circuitry of processor 101, in addition to BPU 218, includes multiple functional units for executing sequential instructions, including fixed-point-unit (FXU) 223, load/store unit (LSU) 228, and floating-point unit (FPU) 230. Each of execution units 223, 228, and 230 typically executes one or more instructions of a particular type of sequential instruction during each processor cycle. For example, FXU 223 performs fixed-point mathematical and logical operations such as addition, subtraction, ANDing, ORing, and XORing, utilizing source operands received from specified general purpose registers (GPRs) 232. Following the execution of a fixed-point instruction, FXU 223 outputs the data results of the instruction to GPR buffers 233, which provide storage for the result received on result bus 262.

The FPU 230 typically performs single and double-precision floating-point arithmetic and logical operations, such as floating-point multiplication and division, on source operands received from floating-point registers (FPRs) 236. FPU 230 outputs data resulting from the execution of floating-point instructions to selected FPR buffers 237, which store the result data.

As its name implies, LSU 228 typically executes floating-point and fixed-point load instructions, which load data from data cache 216, a lower level cache memory (not depicted), or system memory 250 into selected GPRs 232 or FPRs 236 and floating-point and fixed-point store instructions, which store data from a selected one of GPRs 232 or FPRs 236 to data cache 216 and, ultimately, to system memory 250.

Figure 3:
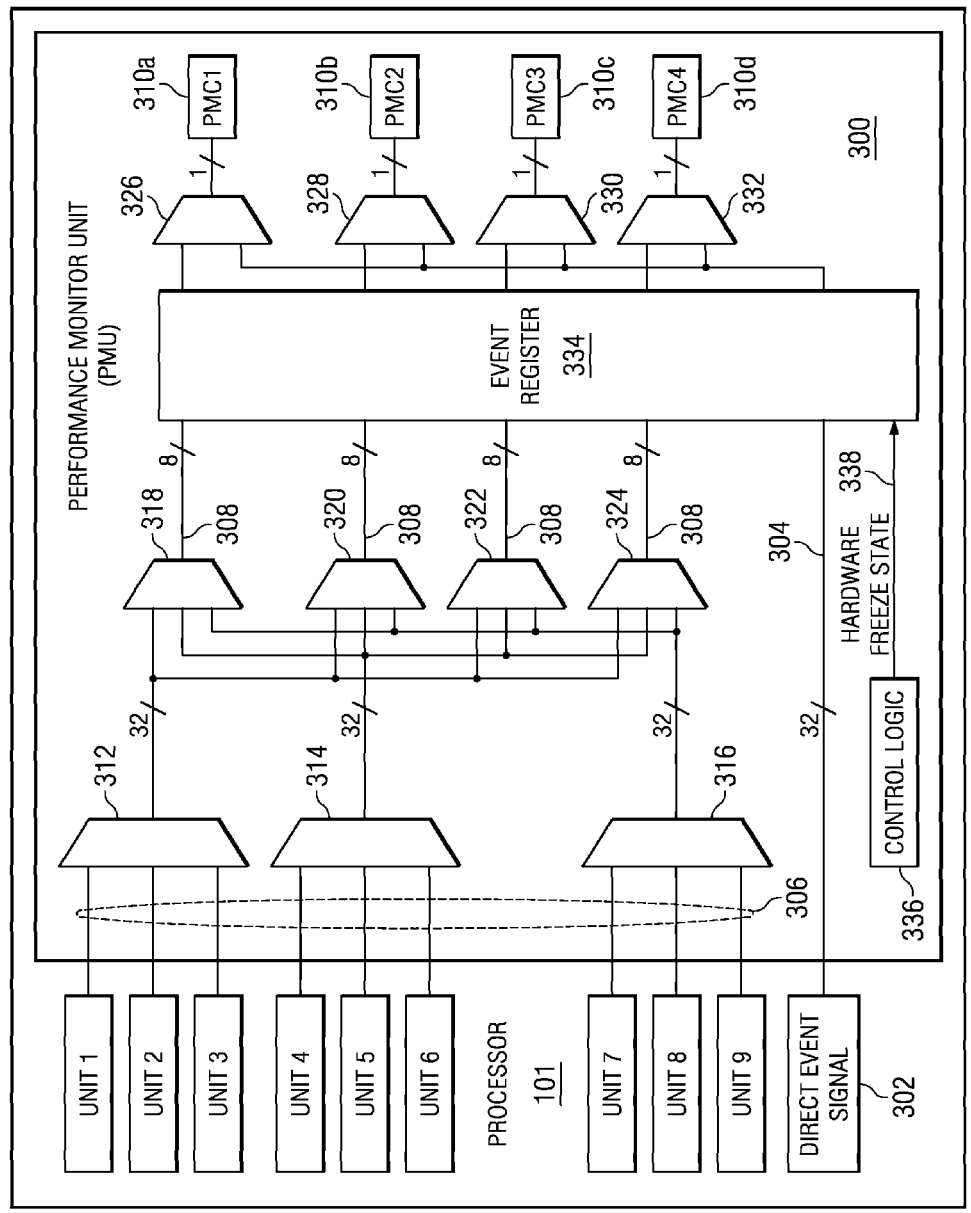
FIG. 3 is a high level block diagram of the processor of FIG. 1 including a performance monitor that includes the present invention in accordance with the present invention.

FIG. 3 is a high level block diagram of the processor of FIG. 1 including a performance monitor that includes the present invention in accordance with the present invention. Each processor 101 according to the present invention includes a performance monitor unit (PMU) 300. PMU 300 is configured to detect and record the occurrence of specified events that occur in the execution units and other functional units of processor 101. The event may result in the generation of an event signal that indicates that a specific operation has occurred in a unit of processor 101.

PMU 300 is capable of capturing indirect events and direct events. Direct events represent high priority events, such as the dispatch or completion of an instruction, that must be available to PMU 300 at all times. In the preferred embodiment, direct event signals 302, each of which indicates the occurrence of a corresponding direct event, are routed directly to PMU 300 via a dedicated wire 304. An example of a direct event is an instruction dispatch event, issuing from dispatch unit 220. Another example of a direct event is an instruction completion event, issuing from completion unit 240.

Processor 101 is also capable of capturing indirect events via a shared performance monitor bus 306. Using performance monitor bus 306 to carry indirect event signals beneficially reduces the number of interconnects or wires that must be routed to PMU 300 thereby saving valuable die size. Exemplary indirect events are illustrated issuing from units 1-9 that may include fetch unit 217, dispatch unit 220, LSU 228, FXU 223, completion unit 240, and/or any other unit within processor 101.

In one embodiment of processor 101, the shared bus 306 is implemented as a 32-bit bus that is logically divided into four sub-divisions or "byte lanes" of eight bits each. Byte-lanes 308 may be selectively provided to the performance monitor counters 310a-d of PMU 300 to further reduce the number and complexity of the wires required to implement the design of PMU 300 within a given (and limited) area.

Performance monitor 300 may include several multiplexers 312, 314, 316, 318, 320, 322, 324, 326, 328, 330, and 332 that are used to select among the various available signals in order to reduce the size and complexity of performance monitor 300.

Performance monitor 300 includes a software accessible event register 334. Event register 334 receives the event signals generated by processor 101 prior to any signals being counted by a counter within performance monitor 300. Event register 334 receives a new set of event signals at each clock cycle. If the contents of event register 334 are not copied from event register prior to the next clock cycle, the contents will be overwritten with the values of the event signals a the next clock cycle.

The values of the event signals that are captured by event register 334 are stored together as one unit of data. Thus, if 32 event signals are generated by processor 101, event register 334 will include 32-bits of data. Therefore, the contents of event register 334 will indicate which events occurred in processor 101 at any one particular clock cycle.

The current contents of the event register may be copied into other more permanent storage upon the occurrence of a predefined condition or may be retrieved by a software routine at a time determined by that routine.

Control logic 336 is provided within performance monitor 300 that is coupled to event register 334 via a hardware freeze state line 338. Control logic 336 receives information from the various components of performance monitor 300 and from processor 101. For example, if a freeze condition occurs within a component in performance monitor 300, that freeze condition will be reported to control logic 336. An example of a freeze condition is when one of the counters 310a-d overflows.

When a freeze condition occurs in performance monitor 300 or when control logic 336 is notified of a freeze condition by processor 101, control logic 336 will cause hardware freeze state line 338 to go to a value that indicates the freeze state. For example, control logic 336 may cause hardware freeze state line 338 to go to a logical HIGH value. This then puts event register 334 into freeze mode.

When a freeze condition has cleared and no longer exists, control logic 336 will cause hardware freeze state line 338 to go to a value that indicates that there is no freeze state. For example, control logic 336 may cause hardware freeze state line 338 to go to a logical LOW value. This then puts event register 334 back into a normal, non-freeze mode.

When event register 334 enters into a freeze mode, the contents of event register 334 may be copied from event register 334 and stored in other storage. For example, when event register 334 enters into a freeze mode, control logic 336 may copy the contents of event register 334 to other storage.

Figure 4:
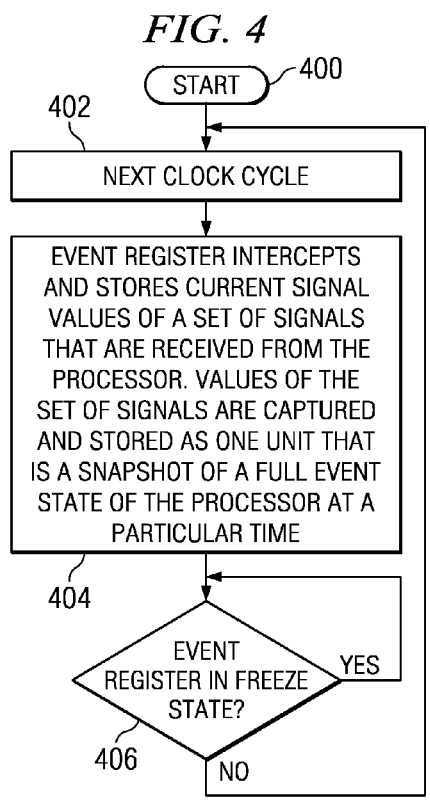
FIG. 4 illustrates a high level flow chart that depicts intercepting, capturing, and storing the current signal values event signals that represent the full event state of a processor in accordance with the present invention.

FIG. 4 illustrates a high level flow chart that depicts intercepting, capturing, and storing the current signal values event signals that represent the full event state of a processor in accordance with the present invention. The process starts as depicted by block 400 and thereafter passes to block 402 which illustrates the occurrence of the next clock cycle. Thereafter, block 404 depicts the event register intercepting and storing the current signal values of a set of event signals received from the processor. The values of the set of signals are captured and stored in the event registers as one unit that represents the full set of available event signals. The one unit is a snapshot of the full event state of the processor at this particular time. Next, block 406 illustrates a determination of whether or not the event register is in freeze state. If a determination is made that the event register is in freeze state, the process passes back to block 406. If a determination is made that the event register is not in freeze state, the process passes back to block 402.

Figure 5:
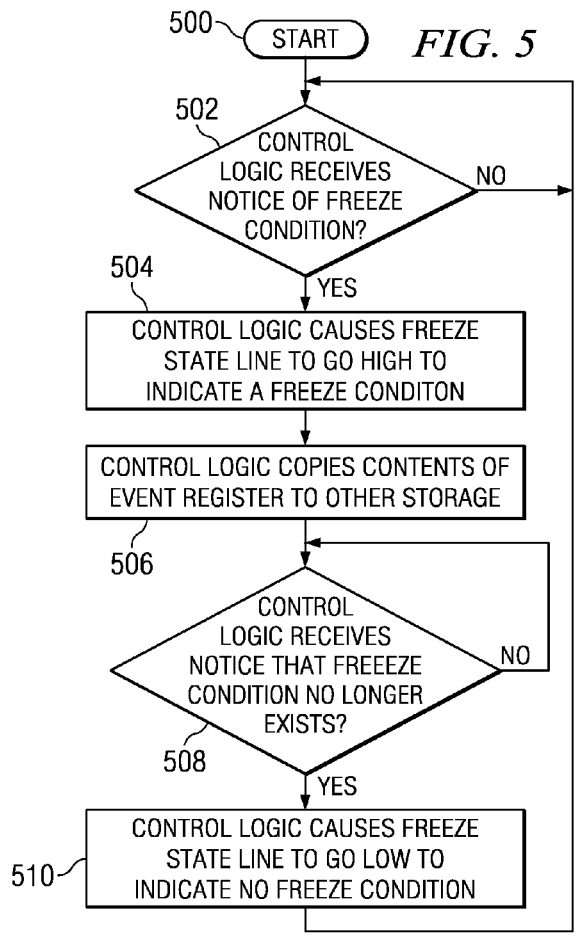
FIG. 5 depicts a high level flow chart that illustrates the performance monitor's control logic controlling the freeze state in the event register in accordance with the present invention.

FIG. 5 depicts a high level flow chart that illustrates the performance monitor's control logic controlling the freeze state in the event register in accordance with the present invention. The process starts as depicted by block 500 and thereafter passes to block 502 which illustrates a determination of whether or not the control logic in the performance monitor has received a notice of a freeze condition. This notice may be received from the processor as the result of a processor triggered event or it may be received from within the performance monitor itself as a notice of a particular condition. For example, if a performance monitor counter overflows, the counter will typically generate a notice of a freeze condition. The notice would then be received by the control logic.

Referring to block 502, if a determination is made that the control logic has not received a notice of a freeze condition, the process passes back to block 502. If a determination is made that the control logic has received a notice of a freeze condition, the process passes to block 504 which depicts the control logic causing the hardware freeze state line to go to a logical HIGH level to indicate that the a freeze condition has occurred. Alternatively, those skilled in the art will recognize that the hardware freeze state line may be caused to go to a logical LOW level to indicate that a freeze state has occurred.

The process then passes to block 506 which illustrates the control logic copying the contents of the event register to other storage. Alternatively, instead of the control logic copying the contents, the event register may be a software accessible register that is accessed by a software routine. The software routine may monitor the freeze state of the event register and then retrieve and save the contents of the register when the register enters in freeze state.

Next, block 508 depicts a determination of whether or not the control logic has received a notice that the freeze condition no longer exists. If a determination is made that the control logic has not received a notice that the freeze condition no longer exists, the process passes back to block 508. If a determination is made that the control logic has received a notice that the freeze condition no longer exists, the process passes to block 510 which depicts the control logic causing the hardware freeze state line to go to a logical LOW level to indicate that the freeze condition no longer exists. Alternatively, those skilled in the art will recognize that the hardware freeze state line may be caused to go to a logical HIGH level to indicate that a freeze condition no longer exists. The process then passes back to block 502.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A performance monitor hardware unit that is included in a processor, the performance monitor hardware unit monitoring the performance of the processor, the performance monitor hardware unit comprising:
   a plurality of hardware counters that count only a selected subset of a plurality of performance event signals received by the performance monitor hardware unit;
   a hardware event register that intercepts the plurality of performance event signals and outputs the selected subset of the plurality of performance signals to the plurality of hardware counters;
   a single unit in the hardware event register that stores current values of the plurality of performance event signals received by the processor, the single unit being a full set of available performance event signals that indicates the current full event state of the processor at a particular time;
   control logic that is coupled to the hardware event register utilizing a freeze state line;
   control logic that receives a notification of a freeze condition;
   control logic that causes the hardware event register to enter a freeze state in response to the control logic receiving the notification of the freeze condition;
   control logic that receives the notification that the freeze condition no longer exists; and
   control logic that causes the hardware event register to enter a normal, non-freeze state in response to the control logic receiving the notification that the freeze condition no longer exists.

2. The performance monitor hardware unit according to claim 1, further comprising:
   the control logic copying the single unit currently stored in the hardware event register to memory in response to the control logic receiving the notification of a freeze condition.

3. The performance monitor hardware unit according to claim 1, wherein the hardware event register causes the single unit stored in the hardware event register to be copied to memory in response to the hardware event register entering the freeze state.

4. The performance monitor hardware unit according to claim 1, wherein the
   hardware event register is software accessible; and
   the single unit stored in the hardware event register is accessed by a software routine that copies the single unit from the hardware event register to memory.

5. The performance monitor hardware unit according to claim 1, wherein the hardware event register receives a new set of performance event signals and overwrites the current values of the plurality of performance event signals upon each occurrence of a clock cycle.

6. The performance monitor hardware unit according to claim 1, wherein the performance monitor hardware unit includes at least one multiplexer that receives at least two of the plurality of performance event signals, and wherein an output of the multiplexer is connected to the hardware event register.

7. The performance monitor hardware unit according to claim 1, further comprising a dedicated physical wire that is connected to a monitored unit and to the hardware event register, wherein the performance monitor hardware unit receives a particular one of the plurality of performance signals using the dedicated physical wire.

8. The performance monitor hardware unit according to claim 1, wherein the performance monitor hardware unit includes at least one multiplexer that receives at least two of the plurality of performance event signals, and wherein an output of the multiplexer is connected to the hardware event register; and further comprising a dedicated physical wire that is connected to a monitored unit and to the hardware event register, wherein the performance monitor hardware unit receives a particular one of the plurality of performance signals using the dedicated physical wire.

9. The performance monitor hardware unit according to claim 1, further comprising a completion unit that generates one of the plurality of performance signals.

10. A computer program product, comprising a non-transitory computer recordable medium in a performance monitor hardware unit, the computer recordable medium tangibly embodying a plurality of instructions executable by a processor, the instructions comprising:

instructions for receiving, within the performance monitor hardware unit, a plurality of performance event signals, a plurality of performance event signals indicating a current full event state of the processor at a particular time;

instructions for counting only a selected subset of the plurality of performance event signals by a plurality of hardware counters included in the performance monitor hardware unit;

instructions for intercepting, by a hardware event register included in the performance monitor hardware unit, the plurality of performance event signals; and instructions for outputting, by the hardware event register, the selected subset of the performance signals to the plurality of counters;

instructions for storing current values of the plurality of performance event signals together as a single unit in the hardware event register, the single unit being a full set of available performance event signals that indicate the current full event state of the processor at a particular time;

instructions for storing current values of the plurality of performance event signals together as a single unit in the hardware event register upon each occurrence of a clock cycle; and instructions for overwriting the current values of the hardware event register upon each clock cycle.

11. The computer program product according to claim 10, further comprising control logic that is included in the performance monitor being coupled to the hardware event register utilizing a freeze state line, the computer recordable medium further comprising:

instructions for receiving, by the control logic, a notification of a freeze condition;

instructions for causing, by the control logic, the hardware event register to enter a freeze state in response to the control logic receiving the notification of the freeze condition;

instructions for receiving, by the control logic, a notification that the freeze condition no longer exists; and instructions for causing, by the control logic, the hardware event register to enter a normal, non-freeze state in response to the control logic receiving the notification that the freeze condition no longer exists.

12. The computer program product according to claim 11, further comprising:

instructions for copying, by the control logic, the single unit currently stored in the hardware event register to memory in response to the control logic receiving the notification of a freeze condition.

13. The computer program product according to claim 11, further comprising:

instructions for causing, by the hardware event register, the single unit stored in the hardware event register to be copied to memory in response to the hardware event register entering the freeze state.

14. The computer program product according to claim 10, further comprising:

instructions for copying the single unit stored in the hardware event register from the hardware event register.

15. The computer program product according to claim 10, wherein the performance monitor hardware unit includes at least one multiplexer that receives at least two of the plurality of performance event signals, and wherein an output of the multiplexer is connected to the hardware event register.

16. The computer program product according to claim 10, further comprising a dedicated physical wire that is connected to a monitored unit and to the hardware event register, wherein the performance monitor hardware unit receives a particular one of the plurality of performance signals using the dedicated physical wire.

17. The computer program product according to claim 10, wherein the performance monitor hardware unit includes at least one multiplexer that receives at least two of the plurality of performance event signals, and wherein an output of the multiplexer is connected to the hardware event register; and further comprising a dedicated physical wire that is connected to a monitored unit and to the hardware event register, wherein the performance monitor hardware unit receives a particular one of the plurality of performance signals using the dedicated physical wire.

18. A performance monitor hardware unit that is included in a processor, the performance monitor hardware unit monitoring the performance of the processor, the performance monitor hardware unit comprising:

a plurality of hardware counters that count only a selected subset of a plurality of performance event signals received by the performance monitor hardware unit;

a hardware event register that intercepts the plurality of performance event signals and outputs the selected subset of the plurality of performance signals to the plurality of hardware counters;

at least one multiplexer that receives at least two of the plurality of performance event signals, and wherein an output of the multiplexer is connected to the hardware event register;

wherein the hardware event register receives a new set of performance event signals and overwrites the current values of the plurality of performance event signals upon each occurrence of a clock cycle; and a single unit in the hardware event register that stores current values of the plurality of performance event signals received by the processor, the single unit being a full set of available performance event signals that indicates the current full event state of the processor at a particular time.

19. A performance monitor hardware unit comprising:

means for receiving, within the performance monitor hardware unit, a plurality of performance event signals, wherein the plurality of performance event signals indicate a current full event state of the processor at a particular time;

means for counting only a selected subset of the plurality of performance event signals by a plurality of hardware counters included in the performance monitor hardware unit;

means for intercepting, by a hardware event register included in the performance monitor hardware unit, the plurality of performance event signals;

means for outputting, by the hardware event register, the selected subset of the performance signals to the plurality of counters;

means for storing current values of the plurality of performance event signals together as a single unit in the hardware event register, wherein the single unit is a full set of available performance event signals that indicate the current full event state of the processor at a particular time;

means for storing current values of the plurality of performance event signals together as a single unit in the hardware event register upon each occurrence of a clock cycle; and means for overwriting the current values of the hardware event register upon each clock cycle.

* * * * *